Patented Feb. 8, 1944

2,340,918

UNITED STATES PATENT OFFICE 2,340,918

PROCESS FOR PROTECTING PLATE GLASS IN STORAGE

Donald L. Wright, Westfield, N. J., assignor to Standard Oil Development Company, a corporation of Delaware No Drawing. Application November 14, 1939, Serial No. 304,310

5 Claims. (Cl. 117—124)

This invention relates to a process for protecting plate glass and particularly to protect the glass by preventing the formation of surface discolorations such as iridescence or dullness during storage.

Manufacturers prepare various types of plate glass: (1) wire glass, that is, a plate glass with a metallic wire embedded therein beneath the surface of the glass and having either both surfaces of smooth finish or with one surface smooth and one corrugated; (2) plate glass of which one side is corrugated and the other side a smooth finish; and (3) plate glass in which both sides are smooth. Such glass as may have smooth finish surfaces may be of the conventional plate type or the surfaces may have superior finish due to mechanical polishing during manufacture.

The manufactured glass is obviously not all immediately shipped to the trade, but may be kept in storage for a number of months until a demand arises. Stored plate glass frequently develops an iridescent film or a dullness upon the surface of the glass after it had been in storage for a number of months. This is attributed to the oxidizing influence of air and moisture and is particularly accelerated by storage under conditions of high humidity. Noticeable iridescence or dullness is of course unacceptable to the trade and manufacturers frequently find it necessary with glass which has been stored any length of time to wash just prior to shipment with hydrofluoric or other acids. This condition with polished plate glass cannot be corrected simply by means of the hydrofluoric acid bath alone but the surface must be repolished by rubbing with rouge to obtain the required smooth finish.

An object of this invention is to provide a process whereby the plate glass can be protected against the formation of iridescence or dullness on the surface on storage even in a humid storage compartment.

According to this invention, plate glass, after it has been manufactured and, in the case of polished plate, polished to the required finish, is coated by means of spray, roller or wipe methods, with an oily composition, that is, with a predominately petroleum oil having a volatility less than that of gasoline and a Saybolt viscosity not over 1000 seconds at 100° F., preferably one having a Saybolt viscosity not over 300 seconds at 100° F. This oily composition may be readily removed before the plate glass is shipped or even after installation in a window frame by wiping or rubbing with a fibrous material soaked in a hydrocarbon solvent or by washing with soap and water. Alternately, if desired, the oily composition may be blended with fatty oils, such as neutral degras, vegetable oil residues, such linseed oil residues, fatty acids formed by oxidizing paraffin waxes, etc. The percentage of fatty oil added may vary from 2% to about 30%. At least 5% of the finished composition should be non-volatile at 100° F.

Another method of using this oily composition is to incorporate into the oil base from 2 to 30% of oil-soluble sulfonates with or without 2 to 30% of neutral degras. This latter composition is preferred as it may be readily removed by washing with water. Other soaps may be used instead of sodium or potassium sulfonates.

I claim:

1. A process of protecting glass surface from the formation of iridescence which comprises coating the glass surface with a composition consisting of petroleum oil having a volatility less than that of gasoline, a Saybolt viscosity less than 1000 seconds at 100° F., and 2 to 30% of an oil-soluble sulfonate and 2 to 30% of a fatty oil.

2. A process according to claim 1, in which the fatty oil is degras.

3. A process according to claim 1, in which the said sulfonate is an oil-soluble sulfonate of an alkali metal.

4. A process of protecting glass surface from discoloration that is not readily removed by rubbing and washing which comprises coating the glass surface with a composition consisting of petroleum oil having a volatility less than that of gasoline, a Saybolt viscosity of about 300 seconds at 100° F., and an oil-soluble alkali sulfonate and 2–30% of an animal fatty oil.

5. The process of rendering a glass surface resistant to surface discolorations which surface is capable of iridescence discoloration on storage which comprises applying directly on said surface a composition consisting of a non-aqueous oily composition which is predominately a petroleum oil with a Saybolt viscosity less than 1000 seconds at 100° F., 2 to 30% of an oil-soluble sulfonate and 2 to 30% of a fatty oil.

DONALD L. WRIGHT.